Patented Oct. 14, 1947

2,429,147

UNITED STATES PATENT OFFICE 2,429,147

PRODUCTION OF DIHYDROXYFLUOBORIC ACID

Wayne E. White, Plum Township, Allegheny County, Pa., assignor to Aluminum Company of America, a corporation of Pennsylvania No Drawing. Application January 29, 1945, Serial No. 575,201

5 Claims. (Cl. 23—139)

This invention relates to the production of dihydroxyfluoboric acid, and it is an object of the invention to provide a method of producing dihydroxyfluoboric acid which is efficient and economical.

Dihydroxyfluoboric acid is a viscous liquid having a boiling point of about 160° C. The methods which have been proposed heretofore for its preparation have in all instances been subject to objection on one or both of the grounds of lack of efficiency of the reaction involved and the expensive reagents and equipment required.

In accordance with this invention dihydroxyfluoboric acid is produced by reacting together a fluorine compound, boric oxide, and water. Instead of using boric oxide as such, compounds capable of providing boric oxide values available for reaction in the process, such as boric acid, can be employed, and references herein to boric oxide include boric oxide values provided in that manner. In the preferred form of the invention boron trifluoride is the fluorine compound used, it being introduced in the vapor state into a suspension of boric acid in water. The resulting reaction can be expressed as follows:

$$H_3BO_3 + 2BF_3 + 3H_2O \rightarrow 3HB(OH)_2F_2$$

In carrying out this reaction, if the various reagents are employed in the stoichiometric amounts indicated by the above equation, substantially pure dihydroxyfluoboric acid is produced, and reaction of the reagents is substantially 100 per cent complete. Boron trifluoride vapor is readily soluble in water and when dissolved by the water reacts readily, with the result that there is substantially no loss of boron trifluoride in the process.

It is especially desirable that the reactants be used in stoichiometric amounts in order to have an efficient and economical process. If boric acid in excess of the stoichiometric amount is used, this excess will largely remain undissolved and unreacted. Boron trifluoride is readily absorbed by dihydroxyfluoboric acid, and although an excess of this reactant may not be objectionable in some cases from the standpoint of utility, since its presence may add to the value of the product as a catalyst, it would add to the material costs. Water causes decomposition of dihydroxyfluoboric acid and consequently it is essential that water not be present in excess.

Instead of using gaseous boron trifluoride as the fluorine compound, fluoboric acid can be employed, in which case the following equation indicates the reaction:

$$HBF_4 + H_3BO_3 + H_2O \rightarrow 2HB(OH)_2F_2$$

If desired, the fluoboric acid can be produced in situ by reaction of a fluoborate, such as calcium fluoborate, barium fluoborate, sodium fluoborate, or potassium fluoborate, with an acid such as sulfuric acid. The fluoboric acid thus produced then reacts in the manner indicated in the above equation.

In another modification of the invention hydrofluoric acid is produced in situ in a mix containing boric oxide and water, and immediately reacts with the latter materials to produce dihydroxyfluoboric acid. For example, hydrofluoric acid can be produced in the presence of boric oxide and water by reaction of calcium fluoride and sulfuric acid, and the hydrofluoric acid then reacts with the boric oxide and water to form dihydroxyfluoboric acid. This procedure is shown in the following equations:

(1)     $CaF_2 + H_2SO_4 \rightarrow CaSO_4 + 2HF$
(2)     $4HF + B_2O_3 + H_2O \rightarrow 2HB(OH)_2F_2$ In this modification it is necessary to heat the mixed reagents at a temperature at which Reaction 1 above takes place, and it is convenient to employ a temperature of at least 160° C. so that the dihydroxyfluoboric acid produced in accordance with Equation 2 will be separated from the calcium sulfate by distillation and subsequent condensation of that acid. In those instances in which the dihydroxyfluoboric acid is vaporized, it is advisable to cool the vapors slowly so as to permit recombination of dissociated constituents of the dihydroxyfluoboric acid vapor.

The invention is illustrated by the following examples:

Example I 31 grams of boric acid and 27 grams of water were mixed together in a glass container, and 81 grams of gaseous boron trifluoride were fed into the mix. The mixture was heated at about 150° C. for a few minutes to drive off excess boron trifluoride present. 122 grams of pure dihydroxyfluoboric acid were thus obtained, which amount was approximately 97 per cent of that theoretically obtainable.

Example II 22 grams of sodium fluoborate, 34.7 grams of barium fluoborate dihydrate, 24.7 grams of boric acid, 21 grams of 96 per cent sulfuric acid, and 4 grams of water were mixed together in a glass vessel. This mix was heated at 160° C. for about 30 minutes, the vapors produced being returned to a glass vessel maintained at 25° C. 60 grams of pure dihydroxyfluoboric acid were recovered in the container.

I claim:

1. The method of producing dihydroxyfluoboric acid which comprises mixing together water, material of the group consisting of boric acid and boric oxide, and a fluorine compound in the absence of available water values in excess of the amount converted to dihydroxyfluoboric acid.

2. The method of producing dihydroxyfluoboric acid which comprises reacting together boron trifluoride, boric acid, and water in the absence of available water values in excess of the amount converted to dihydroxyfluoboric acid.

3. The method of producing dihydroxyfluoboric acid which comprises reacting together water, boric oxide, and fluoboric acid in the absence of available water values in excess of the amount converted to dihydroxyfluoboric acid.

4. The method of producing dihydroxyfluoboric acid which comprises reacting together water, boric oxide, and hydrofluoric acid in the absence of available water values in excess of the amount converted to dihydroxyfluoboric acid.

5. The method of producing dihydroxyfluoboric acid which comprises mixing together water, boric oxide, and a fluorine compound in the absence of available water values in excess of the amount converted to dihydroxyfluoboric acid, heating the resultant dihydroxyfluoboric acid at a temperature sufficient to cause it to volatilize, and condensing the resultant vapor.

WAYNE E. WHITE.

REFERENCES CITED

The following references are of record in the file of this patent:

"Cellulose Esters," Chemical Abstracts, vol. 34, page 7108. Published by American Chemical Society (1940).